US00RE41724E

(19) United States
(12) Reissued Patent
Myers

(10) Patent Number: US RE41,724 E
(45) Date of Reissued Patent: Sep. 21, 2010

(54) TRUCK BED COVER

(75) Inventor: Eugene A. Myers, St. Charles, MO (US)

(73) Assignee: E. D. Industries, Inc., Rogersville, MO (US)

(21) Appl. No.: 12/498,088

(22) Filed: Jul. 6, 2009

Related U.S. Patent Documents

Reissue of:
(64) Patent No.: 6,547,310
Issued: Apr. 15, 2003
Appl. No.: 09/184,271
Filed: Oct. 31, 1998

U.S. Applications:
(60) Provisional application No. 60/063,804, filed on Oct. 31, 1997.

(51) Int. Cl.
*B60P 7/02* (2006.01)

(52) U.S. Cl. ..... 296/100.02; 296/901.01
(58) Field of Classification Search .....
296/100.02–100.09, 100.1, 901, 191; D12/401; 52/783.1, 789.1
See application file for complete search history.

(56) References Cited

U.S. PATENT DOCUMENTS

| | | | | |
|---|---|---|---|---|
| 1,209,265 | A | | 12/1916 | Crowell |
| 1,294,708 | A | | 2/1919 | Rochlis |
| 2,090,815 | A | | 8/1937 | Simmons |
| 2,964,349 | A | | 12/1960 | Picking, Jr. et al. |
| D190,418 | S | * | 5/1961 | Havens ..... D12/401 |
| 3,489,456 | A | | 1/1970 | Klanke |
| 3,568,390 | A | | 3/1971 | Swenson et al. |
| D224,704 | S | | 9/1972 | Hill |
| 3,696,578 | A | | 10/1972 | Swenson et al. |
| 3,785,698 | A | | 1/1974 | Dean et al. |
| 4,079,989 | A | | 3/1978 | Robertson |
| 4,748,789 | A | | 6/1988 | Hedley |
| 4,778,709 | A | | 10/1988 | Abe et al. |
| 4,789,197 | A | | 12/1988 | Lewis |
| 4,824,162 | A | | 4/1989 | Geisler et al. |
| 4,889,758 | A | | 12/1989 | Rinkewich |
| D310,987 | S | | 10/1990 | Law et al. |
| 5,067,766 | A | | 11/1991 | Lovaas |
| 5,190,341 | A | | 3/1993 | Simard |
| D335,850 | S | | 5/1993 | Cyrson |
| D343,602 | S | | 1/1994 | Brown |
| D365,080 | S | | 12/1995 | Loughlin |
| D403,292 | S | | 12/1998 | Bogard |
| 5,857,729 | A | | 1/1999 | Bogard |

FOREIGN PATENT DOCUMENTS

| | | |
|---|---|---|
| DE | 2014805 | 1/1971 |
| JP | 219168 | 11/1985 |

OTHER PUBLICATIONS

"A.R.E." Product Catalog, L Series tonneau covers, Sport Raks, Received Feb. 3, 1997, illustrates a fiberglass tonneau cover.

Photographs 1–6, illustrating various views of truck bed cover sold at least as early as 1991 under the trademark Sportlid by Sportsman's Incorporated of Rogersville, Missouri, where the truck bed cover is shown that is rounded slightly from front to back, and that is rounded slightly from side to side.

Photographs 1–2, illustrating components of a 1954–1955 hood for a car sold under the trademark Corvette.

* cited by examiner

*Primary Examiner*—Dennis H Pedder
(74) *Attorney, Agent, or Firm*—Kang Intellectual Property Law; Grant D. Kang

(57) ABSTRACT

The invention is a truck bed cover made from thermoplastic material. The top of the truck bed cover has a relatively smooth appearance. The underside of the bed cover comprises a support structure utilizing at least one "X"-type support. In the preferred embodiment, four "X"-type supports are utilized. A typical bed cover typically weighs less than 75 pounds for greater ease of handling, without loss of structural support strength over fiberglass covers from loads placed on the top of the bed cover.

6 Claims, 5 Drawing Sheets

TRUCK BED COVER

Matter enclosed in heavy brackets [ ] appears in the original patent but forms no part of this reissue specification; matter printed in italics indicates the additions made by reissue.

This application claims the benefit of Provisional Application No. 60/063,804, filed Oct. 31, 1997.

BACKGROUND OF THE INVENTION

1. Field of the Invention

This invention relates to covers for truck beds and, more particularly, to hard covers for track beds.

2. Related Art

Pickup trucks such as the Ford F-150 truck, and the like have a cabin portion for seating passengers and a bed portion for hauling cargo. The bed portion of a pickup truck is open to the outside environment. Accordingly, any cargo in the bed portion of such a truck is subject to the elements, and is exposed to rain, snow, wind, and sunlight. Because certain cargos should not be subjected to the elements, and because some truck owners prefer to avoid having the bed portion exposed to the elements, the bed portions are covered by bed covers.

Bed covers may typically fall within one of two classes: soft bed covers and hard bed covers. Soft bed covers are made from a fabric material and are snapped to mating snaps placed around the top edge of the truck bed. Structural support for soft covers are generally provided by arched ribs placed normal to the sides of the truck. The arched ribs assist in preventing the soft cover from cupping and resultant water retention.

The arched ribs do not provide adequate support for any load other than the soft cover. For example, a person could not stand on the soft cover without damaging the cover and the underlying ribs. In addition, an impression of the arched ribs is visible under the soft cover such that a smooth outer appearance is not presented.

Hard covers refer essentially to fiberglass-type covers. These covers can provide adequate support for other loads. A person can stand on a fiberglass cover without damaging the cover. In addition, unlike the situation for soft covers, no supporting structure is visible through the top of the cover. The fiberglass cover may be curved, as the soft cover, to prevent water from accumulating thereon.

The manufacturing process to produce a single fiberglass cover is an extensive one. First, the mold is cleaned. After several uses, the mold is both cleaned and polished. Then, a release agent is applied to the mold. Next, a resin called GELCOAT is sprayed over the release agent. This resin need to be cured. After the resin has tacked, a blown, chopped glass-resin mixture is blown with a chopper gun over the GELCOAT resin to achieve a layer of approximately 0.09 to 0.13 inches. Then, the chopped glass-resin mixture is rolled down in a process referred to in the art as "wetting it" to eliminate air bubbles. At this time, any desired structural supports are inserted like foamboard or special cardboard or plywood. Then, another coat of chopped glass-resin mixture is sprayed. This must be then permitted to set with a setting time of approximately 15 minutes. While the mixture is still elastic, the cover is then hand trimmed. After trimming, the cover must be permitted to set for another half hour to an hour. Accordingly, the entire process for making one cover may take from 45 minutes to 90 minutes, depending on the size of the cover and the features ordered for the cover. After the cover is produced, the mold is cleaned (and sometimes polished) and the process is repeated.

A fiberglass cover may typically weigh between 100 and 200 pounds. This weight may make lifting the cover more difficult. While the top of the cover has a smooth, pleasing appearance, the underside of the cover does not have a finished appearance. The retail price of a fiberglass cover is approximately $700 which is approximately three hundred percent more than the retail cost of a soft cover. Because of the manufacturing process, many different materials must be used which increases manufacturing costs and environmental objections. In addition, the manufacturing process is very time consuming because of the curing times involved.

Thermoplastic truck bed covers have been utilized in lieu of fiberglass cover. However, these single-walled bed covers do not have structural support adequate to sustain appreciable loads placed on the top of the cover, such as the load presented by a person standing on the bed cover.

There is a need in the art to provide a cover that can provide adequate support without displaying an outline of the structural support through the top of the cover.

There is a need in the art to provide a truck bed cover utilizing a material other than fiberglass to avoid environmental objections.

There is a need in the art to provide a truck bed cover manufactured using a process that is more efficient than the process of manufacturing fiberglass truck covers.

There is a need in the art to provide a stiff truck bed cover that is lighter than a fiberglass truck bed cover to make lifting the cover easier.

SUMMARY OF THE INVENTION

It is in the view of the above problems that the present invention was developed. The invention is a truck bed cover made from thermoplastic material. The top of the truck bed cover has a relatively smooth appearance. The underside of the bed cover comprises a support structure utilizing "X"-type supports made from a plastic material and unitarily formed, without the use of a separate fastener. In a preferred embodiment, four "X"-type supports are utilized. A typical bed cover typically weighs less than 75 pounds excluding hardware for greater case of handling, without loss of structural support strength from loads placed on the top of the bed cover over fiberglass covers that typically weigh between 100 and 200 pounds.

The truck bed cover is of double-wall construction, with the top of the cover having a relatively smooth appearance, and the underside of the cover presenting a smooth surface of structural supports. Both the top and the underside of the cover may be made from the same material.

The manufacturing process of the bed cover of the present invention is simplified such that the total time to manufacture the cover is on the order of magnitude of twenty minutes. The manufacturing process utilizes fewer materials, and creates waste that can be recycled. Accordingly, the manufacturing process is less costly and more environmentally benign over the manufacturing process for fiberglass bed covers.

Further features and advantages of the present invention, as well as the structure and operation of various embodiments of the present invention, are described below in detail with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
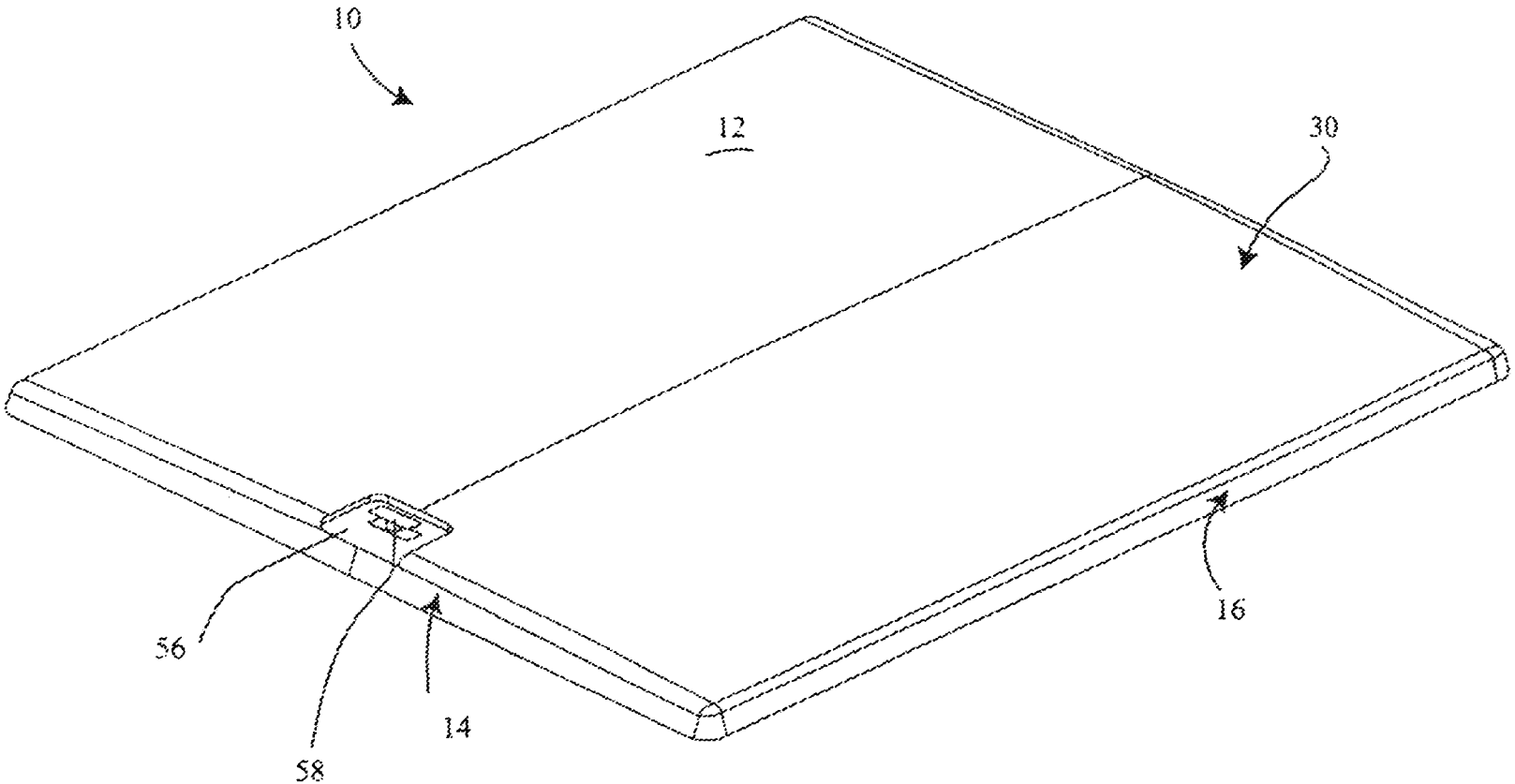
FIG. 1 illustrates a perspective view of the top of a truck bed cover of the present invention.
Figure 2:
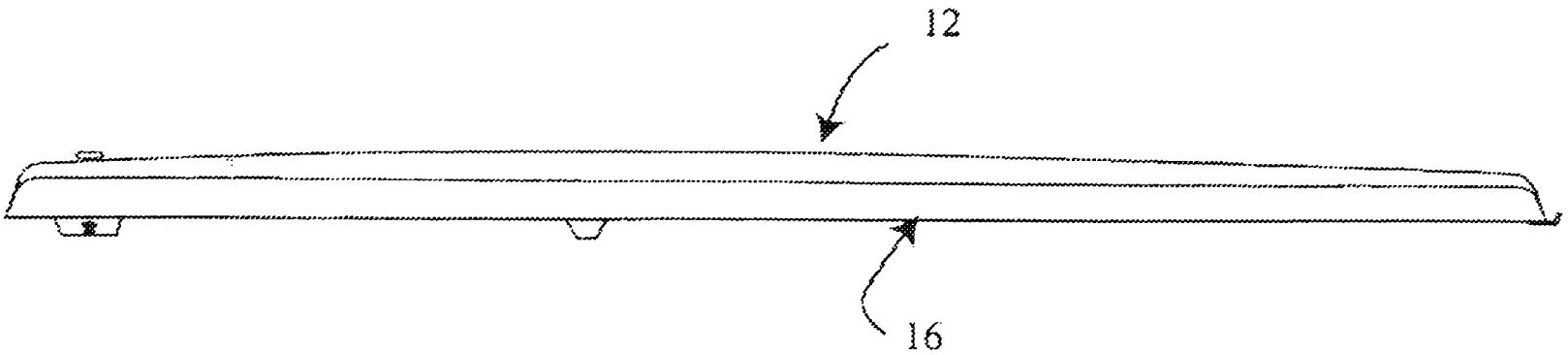
FIG. 2 illustrates a right plan view of the truck bed cover.
Figure 3:
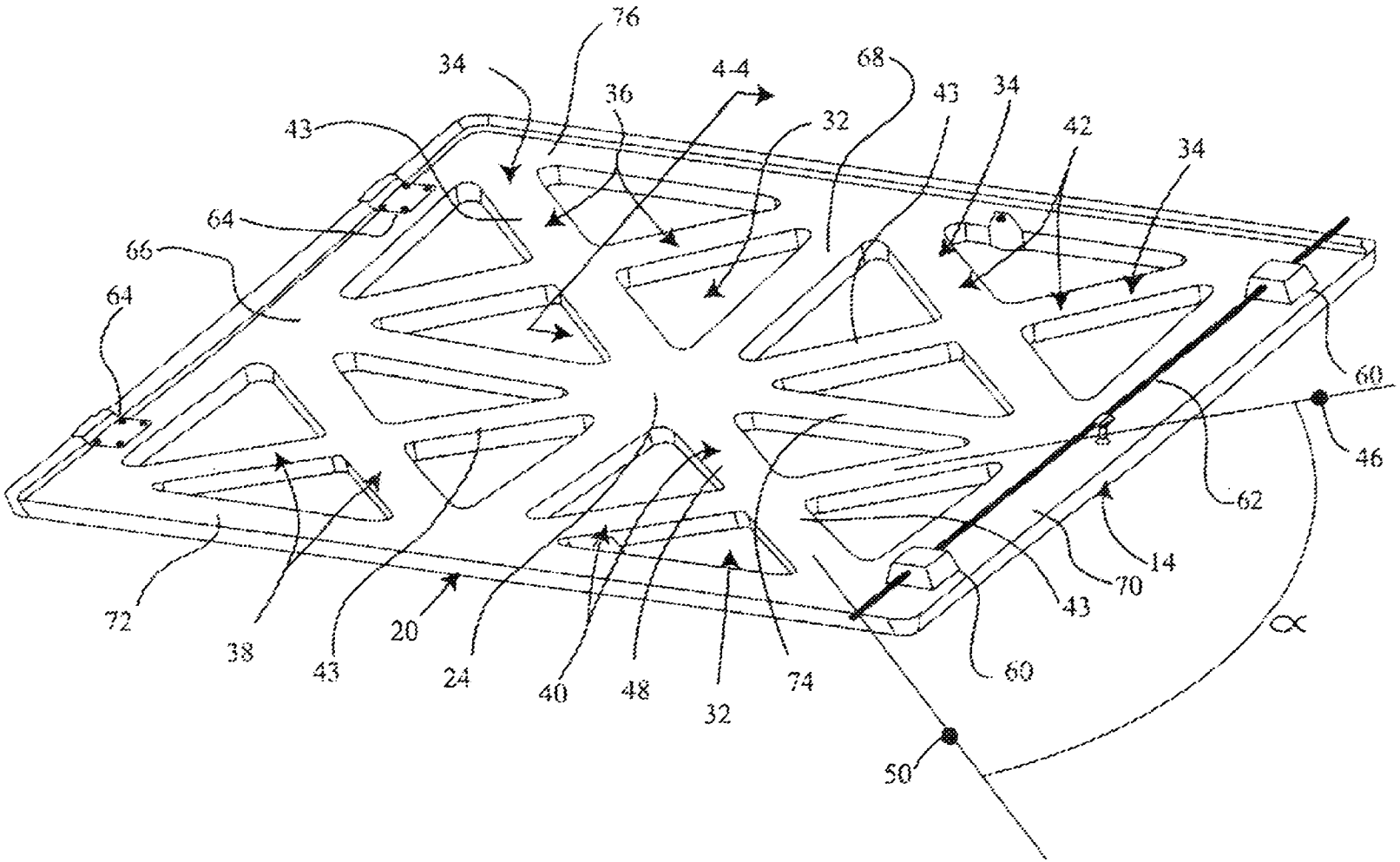
FIG. 3 illustrates a perspective view of the bottom of the truck bed cover of the first embodiment of the present invention.

Referring to the accompanying drawings in which like reference numbers indicate like elements, FIGS. 1, 2 and 3 show various aspects of a truck bed cover, shown generally at 10. Truck bed cover 10 has a top side shown generally at 12, a front side shown generally at 14, a right side shown generally at 16, a rear side (not fully) shown at 18, a left side shown generally at 20, and a bottom side shown generally at 22. As seen in the profile of top side in FIG. 2, top side 12 is rounded from front side 14 to rear side 18. As is also evident from the ability to view top side 12 above right side 16, top side 12 is rounded from right side 16 to left side 20. This is further demonstrated by the centerline of top side 12 in FIG. 1. This rounding prevents accumulation of moisture on cover 10 in the form of rain, snow, or ice.

Figure 4:
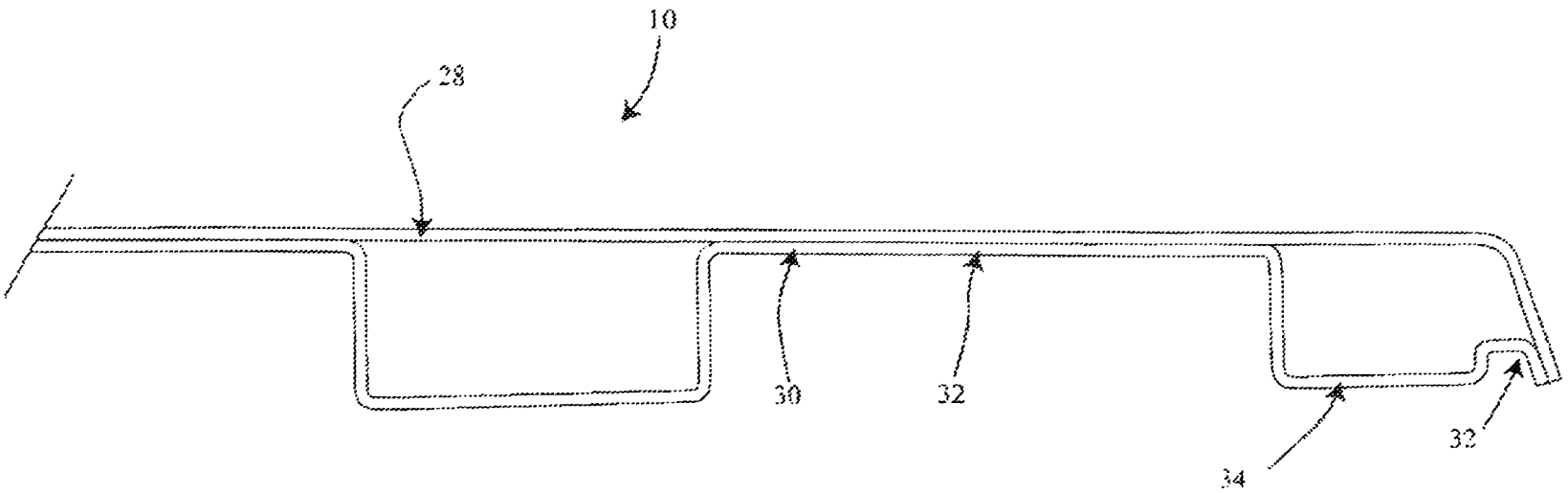
FIG. 4 illustrates a section view taken along section line 4—4 of FIG. 3 of the first embodiment of the present invention.

FIG. 4 is a cross-sectional view taken along line 4—4 of FIG. 3. As is more clearly seen in FIG. 4, truck bed cover 10 comprises top cover shown generally at 28 and support structure shown generally at 30. The term "support structure" 30 is synonymous with the term "support base 30". Top cover 28 and support structure 30 may be made from a plastic material, preferably a thermoplastic material, and most preferably from ABS plastic. It is preferred that top cover 28 be made from virgin ABS plastic and that support structure 30 be made from reground, utility-grade ABS plastic.

Support structure 30 has a plurality of recessed areas 32. Support structure 30 is joined to top cover 28 at a plurality of recessed areas 32 that are best illustrated in FIG. 3. Joinder of support structure 30 with top cover 28 may be accomplished by joining technologies such as adhesive bonding, solvent bonding, thermal welding, ultrasonic welding, urethane foam adhesive, or any other type of joining technology for joining thermoplastics together, or any combination of the joining technologies.

As seen in FIG. 3, support structure 30 includes a plurality of integrally formed support members shown generally at 34 which form first, second, third, and fourth x-shaped support elements, at 36, 38, 40, and 42, respectively, each being disposed in a quadrant of support structure 30. Quadrants are preferred in order to keep the unsupported area on top side 12 to a minimum. Thus, a plurality of x-shaped support elements 36, 38, 40, and 42 respectively are connected, and unitarily formed with said support structure 30. *In the embodiment illustrated in FIG. 3, each of the plurality of recessed areas 32 spans a generally triangular area.*

Figure 6:
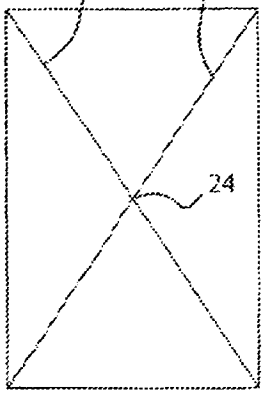
FIG. 6 illustrates a schematic of a third alternative arrangement of structural support members of the bottom of truck bed cover.

It should be noted that a fifth x-shaped support element 43 extends diagonally from corner to corner between the four corners located on the perimeter of support structure 30. The diagonal elements of support element 43 intersect at hub 24. At minimum, this single x-shaped support element 43 is needed (as shown in FIG. 6). Support element 43 is unitarily formed (i.e., without requiring the use of a separate mechanical fastening means such as a screw, rivet, adhesive, or encapsulation) with and from the same material as support structure 30.

Additional support elements include three horizontal elements 66, 68 and 70 and three longitudinal elements 72, 74, and 76.

The x-shaped support elements 36, 38, 40 and 42, respectively, will now be examined in further detail in the following example. First support member 44 has a first longitudinal axis 46. Second support member 48 has a second longitudinal axis 50. First longitudinal axis 46 intersects with second longitudinal axis 50 at an angle $\alpha$ measured clockwise from first longitudinal axis 46. Angle $\alpha$ may measure from approximately thirty to one hundred fifty degrees, preferably sixty to one hundred twenty degrees. Most preferably, angle $\alpha$ is ninety degrees.

The support elements 36, 38, 40 and 42 respectively provide a remarkable amount of strength to top side 12 from vertical loading.

A key feature of any x-shaped support element is that it extends diagonally within a defined quadrangle area. While corner-to-corner coverage is preferred, it is also possible that an x-shaped support element will simply extend from side-to-side without necessarily reaching the furthest point on of any side, namely the corners.

Top side 12 may also be provided with a recess 56 for a handle 58 as shown in FIG. 1. Bottom side 22 may be provided with guides 60 for retaining bar 62 which is connected to handle 58.

In manufacturing top cover 28 and support structure 30, each piece is formed. Preferably top cover 28 is made from virgin ABS while support structure 30 is made from reground utility-grade AUS, although any thermoplastic may be used for top cover 28 and support structure 30. Then top cover 28 and support structure 30 is joined or bonded to the other around the perimeter. It should be noted that if urethane foam adhesive is used, additional structural integrity may result. After joinder, bed cover 10 is trimmed with a trim saw, router, or other trimming tool. Then, edging, gaskets, and ABS backplates 64 may be fixed to bottom side 22. Alternatively, a ridge may be formed along the edge of cover 10 that has the appearance of edge trim, but functions to eliminate the need for providing edge trim separately thereby further reducing cost.

The entire manufacturing process may be performed in less than 20 minutes, with cover 10 being of a stiff material, double wall construction, single piece (one without sections hinged together) cover having a weight of less than 75 pounds. The term "stiff" refers to a non-fabric material such as ABS plastic. The double wall construction is important because it provides enhanced structural strength and rigidity by permitting the use of support structure 30.

Thus, a truck bed cover 10 is described and shown having an upper wall joined to a lower wall, wherein the lower wall structurally supports the upper wall, and wherein the upper wall and lower wall are both made from a thermoplastic material.

Figure 5:
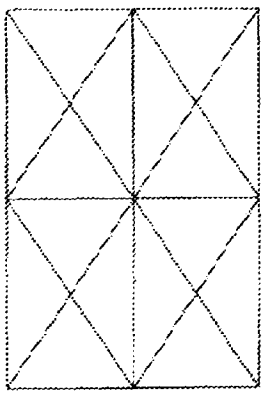
FIG. 5 illustrates a bottom plan view of a schematic of the first embodiment arrangement of structural support members shown in FIG. 3.

FIG. 5 illustrates the arrangement of structural members of the first embodiment discussed above in a schematic form.

FIGS. 6–10 illustrate schematics of alternative arrangements of structural support members of support structure 30. Thus, FIGS. 6–10 represent alternate embodiments of structural support 32 with respect to placement of structural support members, but hold in common all other aspects of the first embodiment such as the methods for manufacturing, the materials, the unitary formation, the recessed areas and the joinder with top cover 28. It should be noted that in each of the alternative embodiments, structural support members are placed about the perimeter of support structure 30.

FIG. 6 illustrates an x-shaped support element 43 that extends diagonally from corner to corner between the four corners located on the perimeter of support structure 30. The diagonal elements of support element 43 intersect at hub 24. The perimeter comprises further support elements.

Figure 7:
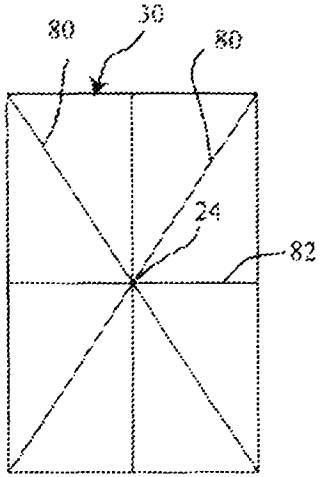
FIG. 7 illustrates a schematic of a fourth alternative arrangement of structural support members of the bottom of truck bed cover.

FIG. 7 illustrates an x-shaped support element 80 in conjunction with a center horizontal support element 82, intersecting at hub 24. The perimeter comprises further support elements.

Figure 8:
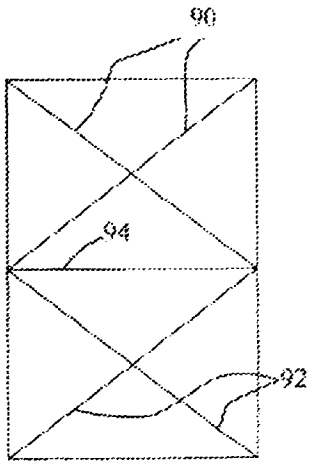
FIG. 8 illustrates a schematic of a fifth alternative arrangement of structural support members of the bottom of truck bed cover.

FIG. 8 illustrates the use of two x-shaped support elements 90, 92 separated by horizontal support element 94. The perimeter comprises further support elements.

Figure 9:
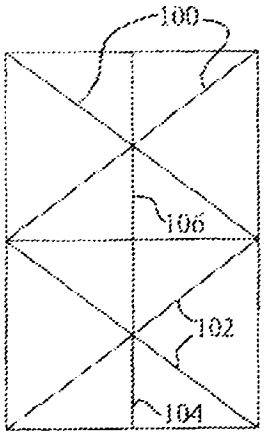
FIG. 9 illustrates a schematic of a sixth alternative arrangement of structural support members of the bottom of truck bed cover.

FIG. 9 illustrates two x-shaped support elements 100, 102 with center horizontal support element 104, and center longitudinal support element 106. The perimeter comprises further support elements.

Figure 10:
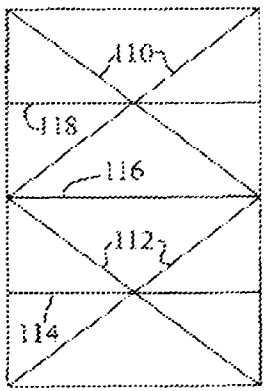
FIG. 10 illustrates a schematic of a seventh alternative arrangement of structural support members of the bottom of truck bed cover.

FIG. 10 illustrates two x-shaped support elements 110, 112 with three horizontal support elements, 114, 116, and 118. The perimeter comprises further support elements.

In view of the foregoing, it will be seen that the several objects of the invention are achieved and other advantages are attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting.

Thus, the breadth and scope of the present invention should not be limited by any of the above-described exemplary embodiments, but should be defined only in accordance with the following claims appended hereto and their equivalents.

What is claimed is:

1. A truck bed cover comprising:

a one-piece, *top* truck bed cover having an upper surface bounded by a front edge, a rear edge, a left edge, and a right edge, said upper surface having a curved portion between said front edge and said rear edge, said upper surface having a curved portion between said left edge and said right edge;

a support structure fixed to said top truck bed cover, said support structure having a plurality of ribless recessed *substantially* triangular areas supporting said top truck bed cover, and a support element forming an x-shape.

2. A truck bed cover according to claim 1, wherein said support element is integrally formed with said support structure.

3. A truck bed cover according to claim 1, wherein said support structure further comprises a plurality of x-shaped support elements.

4. A truck bed cover according to claim 3, wherein said plurality of x-shaped support elements comprises four.

5. A truck bed cover according to claim 4, wherein each of said four x-shaped support elements is disposed in a quadrant of said support structure.

6. A truck bed cover comprising:

a one-piece, *top* truck bed cover having an upper surface bounded by a front edge, a rear edge, a left edge, and a right edge, said upper surface having a curved portion between said front edge and said rear edge, said upper surface having a curved portion between said left edge and said right edge;

a support structure permanently joined to said top truck bed cover to produce a double-walled bed cover, said support structure having a plurality of ribless recessed areas supporting said top truck bed cover, said support structure further having a first linear non-recessed support rib and a second linear non-recessed support rib, wherein said first non-recessed linear support rib intersects said second non-recessed linear support rib.

* * * * *